US012774397B2

(12) United States Patent
Okada et al.

(10) Patent No.: US 12,774,397 B2
(45) Date of Patent: Oct. 27, 2026

(54) METHOD FOR PRODUCING LAMINATED BODY

(71) Applicant: KANEKA CORPORATION, Osaka (JP)

(72) Inventors: Yasunori Okada, Settsu (JP); Itsuki Kusakabe, Settsu (JP)

(73) Assignee: KANEKA CORPORATION, Osaka (JP)

( * ) Notice: Subject to any disclaimer, the term of this patent is extended or adjusted under 35 U.S.C. 154(b) by 374 days.

(21) Appl. No.: 18/698,106

(22) PCT Filed: Oct. 6, 2022

(86) PCT No.: PCT/JP2022/037476

§ 371 (c)(1),
(2) Date: Apr. 3, 2024

(87) PCT Pub. No.: WO2023/063217

PCT Pub. Date: Apr. 20, 2023

(65) Prior Publication Data

US 2024/0392158 A1 Nov. 28, 2024

(30) Foreign Application Priority Data

Oct. 14, 2021 (JP) ................................ 2021-168716

(51) Int. Cl.

| | |
|---|---|
| ***C09D 167/04*** | (2006.01) |
| ***C09D 7/45*** | (2018.01) |
| ***C09D 7/65*** | (2018.01) |
| ***D21H 19/12*** | (2006.01) |
| ***D21H 27/10*** | (2006.01) |

(52) U.S. Cl.

CPC ............. *C09D 167/04* (2013.01); *C09D 7/45* (2018.01); *C09D 7/65* (2018.01); *D21H 19/12* (2013.01); *D21H 27/10* (2013.01)

(58) Field of Classification Search

CPC .......... C09D 167/04; C09D 7/45; C09D 7/65; C09D 5/02; D21H 19/12; D21H 27/10; D21H 19/20; D21H 19/22; D21H 19/28; D21H 19/82; D21H 19/84; D21H 27/30; B05D 3/00; B05D 3/02; B05D 7/24; B05D 1/36; B32B 27/36

See application file for complete search history.

(56) References Cited

U.S. PATENT DOCUMENTS

| | | | |
|---|---|---|---|
| 2013/0101865 | A1 | 4/2013 | Ren et al. |
| 2020/0056214 | A1 | 2/2020 | Kobayashi et al. |

FOREIGN PATENT DOCUMENTS

| | | | |
|---|---|---|---|
| JP | 2-222421 A | | 9/1990 |
| WO | WO 2020/081477 | A1 | 4/2020 |
| WO | WO 2021/100733 | A1 | 5/2021 |

OTHER PUBLICATIONS

International Search Report issued Dec. 6, 2022 in PCT/JP2022/037476, filed on Oct. 6, 2022, 2 pages.

*Primary Examiner* — Michael C Miggins

(74) *Attorney, Agent, or Firm* — Oblon, McClelland, Maier & Neustadt, L.L.P.

(57) ABSTRACT

A method for producing a laminated body including a substrate layer and a resin layer formed on at least one side of the substrate layer, the resin layer containing a poly(3-hydroxybutyrate) resin and having a weight per unit area (dry weight) of 15 to 50 g/m$^2$. The method includes the steps of applying an aqueous dispersion (HB-A) to a surface of the substrate layer to form a coat (a) of the aqueous dispersion (HB-A) and heating the coat (a) to form a coating layer (A) having a weight per unit area (dry weight) of 0.5 to 10 g/m$^2$, wherein the aqueous dispersion (HB-A) contains a poly(3-hydroxybutyrate) resin (a1) and a dispersant (a2) including a water-soluble polymer, and the amount of the dispersant (a2) is from 0.1 to 2.0 parts by weight per 100 parts by weight of the poly(3-hydroxybutyrate) resin (a1); and applying an aqueous dispersion (HB-B) to a side having the coating layer (A) to form a coat (b) of the aqueous dispersion (HB-B) and heating the coat (b) to form a coating layer (B), wherein the aqueous dispersion (HB-B) contains a poly(3-hydroxybutyrate) resin (b1) and a dispersant (b2) including a water-soluble polymer, and the amount of the dispersant (b2) is from 0 to 0.5 parts by weight per 100 parts by weight of the poly(3-hydroxybutyrate) resin (b1).

16 Claims, No Drawings

METHOD FOR PRODUCING LAMINATED BODY

CROSS-REFERENCE TO RELATED APPLICATIONS

The present application is a 35 U.S.C. § 371 national stage patent application of International patent application PCT/JP2022/037476, filed on Oct. 6, 2022, which is based on and claims the benefits of priority to Japanese Application No. 2021-168716, filed on Oct. 14, 2021. The entire contents of all of the above applications are incorporated herein by reference.

TECHNICAL FIELD

The present invention relates to a method for producing a laminated body including a substrate layer and a resin layer that is located on at least one side of the substrate layer and that contains a poly(3-hydroxybutyrate) resin.

BACKGROUND ART

In recent years, environmental problems due to waste plastics have become an issue of great concern. In particular, waste plastics have caused serious marine pollution, and there is a demand for widespread use of biodegradable plastics which are degradable in the natural environment.

Various kinds of such biodegradable plastics are known. Poly(3-hydroxyalkanoate) resins are thermoplastic polyesters produced and accumulated as energy storage substances in the cells of many kinds of microorganisms, and these resins are biodegradable in seawater as well as in soil and thus are attracting attention as materials that can be a solution to the above-mentioned problems.

A laminated body including a biodegradable substrate such as paper and a poly(3-hydroxybutyrate) resin-containing layer located on the substrate is very promising in terms of environmental protection because both the resin and the substrate have high biodegradability.

A laminated body including paper coated with an aqueous dispersion of a resin is conventionally known. A previously proposed laminated body that contains a poly(3-hydroxybutyrate) resin as described above is one obtained by coating a substrate with an aqueous dispersion containing polyhydroxybutyrate-polyhydroxyvalerate copolymer, polyvinyl alcohol, and a polycarboxylate acid dispersant and then by heat-treating the dispersion on the substrate (see Patent Literature 1).

CITATION LIST

Patent Literature

PTL 1: Japanese Laid-Open Patent Application Publication No. H2-222421

SUMMARY OF INVENTION

Technical Problem

In the production method described in Patent Literature 1, a laminated body is produced by forming a poly(3-hydroxybutyrate) resin layer on a substrate. This method requires the use of a large amount of water-soluble polymer such as polyvinyl alcohol to disperse the poly(3-hydroxybutyrate) resin in water, and thus the laminated body suffers from insufficient water resistance.

Additionally, a study by the present inventors has revealed another problem. The problem is that when an aqueous dispersion containing a reduced amount of water-soluble polymer dispersant is used in attempting to obtain a laminated body including a resin layer whose dry weight per unit area (also referred to as "weight per square meter") is large so that the resin layer may exhibit high barrier performance against water or oils, a heating process subsequent to application of the aqueous dispersion to a substrate causes peeling of a coating layer from the substrate.

In view of the above circumstances, the present invention aims to provide a method for producing a laminated body including a substrate and a poly(3-hydroxybutyrate) resin layer by coating the substrate with an aqueous dispersion containing a poly(3-hydroxybutyrate) resin, the method being one in which the aqueous dispersion used contains a reduced amount of water-soluble polymer dispersant liable to cause low water resistance of the resin layer, which does not suffer from peeling between the resin layer and the substrate layer or between a coating layer and the substrate layer during production of the laminated body, and which allows the resin layer formed to have a large weight per square meter.

Solution to Problem

The present inventors have found that the above problems can be solved by first applying an aqueous poly(3-hydroxybutyrate) resin dispersion containing a certain amount of dispersant to a substrate layer to form a first layer with a certain weight per square meter and then by forming a second layer on the first layer. Based on this finding, the inventors have completed the present invention.

Specifically, the present invention relates to a method for producing a laminated body including a substrate layer and a resin layer formed on at least one side of the substrate layer, the resin layer containing a poly(3-hydroxybutyrate) resin and having a weight per unit area (dry weight) of 15 to 50 g/m$^2$, the method including at least the sequential steps of:

(i) applying an aqueous dispersion (HB-A) to a surface of the substrate layer to form a coat (a) of the aqueous dispersion (HB-A) and heating the coat (a) to form a coating layer (A) having a weight per unit area (dry weight) of 0.5 to 10 g/m$^2$, wherein the aqueous dispersion (HB-A) contains a poly(3-hydroxybutyrate) resin (a1) and a dispersant (a2) including a water-soluble polymer, and an amount of the dispersant (a2) is from 0.1 to 2.0 parts by weight per 100 parts by weight of the poly(3-hydroxybutyrate) resin (a1); and (ii) applying an aqueous dispersion (HB-B) to a side having the coating layer (A) to form a coat (b) of the aqueous dispersion (HB-B) and heating the coat (b) to form a coating layer (B), wherein the aqueous dispersion (HB-B) contains a poly(3-hydroxybutyrate) resin (b1) and a dispersant (b2) including a water-soluble polymer, and an amount of the dispersant (b2) is from 0 to 0.5 parts by weight per 100 parts by weight of the poly(3-hydroxybutyrate) resin (b1).

The present invention further relates to a laminated body including:

a substrate layer; and a resin layer formed on at least one side of the substrate layer, containing a poly(3-hydroxybutyrate) resin, and having a weight per unit area (dry weight) of 15 to 50 $g/m^2$, wherein the resin layer includes a coating layer (A) having a weight per unit area (dry weight) of 0.5 to 10 $g/m^2$ and containing a poly(3-hydroxybutyrate) resin (a1) and a dispersant (a2) including a water-soluble polymer, wherein an amount of the dispersant (a2) is from 0.1 to 2.0 parts by weight per 100 parts by weight of the poly(3-hydroxybutyrate) resin (a1), and a coating layer (B) containing a poly(3-hydroxybutyrate) resin (b1) and a dispersant (b2) including a water-soluble polymer, wherein an amount of the dispersant (b2) is from 0 to 0.5 parts by weight per 100 parts by weight of the poly(3-hydroxybutyrate) resin (b1), and the substrate layer, the coating layer (A), and the coating layer (B) are arranged in this order.

Advantageous Effects of Invention

The present invention can provide a method for producing a laminated body including a substrate and a poly(3-hydroxybutyrate) resin layer by coating the substrate with an aqueous dispersion containing a poly(3-hydroxybutyrate) resin, the method being one in which the aqueous dispersion used contains a reduced amount of water-soluble polymer dispersant liable to cause low water resistance of the resin layer, which does not suffer from peeling between a coating layer and the substrate layer during production of the laminated body, and which allows the resin layer formed to have a large weight per square meter.

A preferred aspect of the present invention can provide a method for producing a laminated body including a resin layer located on a paper substrate and having high water resistance. The use of this production method can provide a laminated body suitable for use as a liquid container such as a paper cup for beverages.

DESCRIPTION OF EMBODIMENTS

Hereinafter, embodiments of the present invention will be described. The present invention is not limited to the embodiments described below.

(Laminated Body)

A laminated body according to one embodiment of the present invention includes a substrate layer and a resin layer formed on at least one side of the substrate layer, and the resin layer contains a poly(3-hydroxybutyrate) resin.

The resin layer is formed by applying aqueous dispersions each of which contains a poly(3-hydroxybutyrate) resin to the surface of the substrate layer and heating the applied dispersions to dryness.

The resin layer may be located on only one side or both sides of the substrate layer. The resin layer may be located over the substrate layer with another layer interposed between the resin layer and the substrate layer or may be located directly on the substrate layer without any other layer interposed between the resin layer and the substrate layer. Another layer may be located on the resin layer.

(Substrate Layer)

The substrate layer is not limited to a particular type and may be any layer on which the resin layer can be located. The substrate layer is preferably a biodegradable layer. When the substrate layer is a biodegradable layer, the whole laminated body including the resin layer is biodegradable. Such a laminated body is more beneficial as a material for solving the problem of marine pollution.

The substrate layer is preferably absorbent in terms of preventing the applied aqueous dispersion from running on the surface of the substrate layer and forming a coat of non-uniform thickness.

Examples of biodegradable substrate layers include, but are not limited to, a layer of paper (whose main component is cellulose), a layer of cellophane, a layer of cellulose ester, a layer of polyvinyl alcohol, a layer of polyamino acid, a layer of polyglycolic acid, a layer of pullulan, and any of these layers on which an inorganic substance such as aluminum or silica is vapor-deposited. A layer of paper is preferred because it has high heat resistance and is inexpensive.

The paper is not limited to a particular type, and examples of the paper include cup paper, kraft paper, high-quality paper, coated paper, tissue paper, glassine paper, and paperboard. The type of the paper can be selected as appropriate depending on the intended use of the laminated body. Additives such as a water-resisting agent, a water repellent, and an inorganic substance may be added to the paper as necessary. The paper may be surface-treated to have an oxygen barrier coating or a water vapor barrier coating.

The weight per unit area of the substrate (the weight per square meter of the substrate) is not limited to a particular range, but is preferably from 50 to 400 $g/m^2$, more preferably from 100 to 300 $g/m^2$, and even more preferably from 150 to 250 $g/m^2$. Controlling the weight per square meter of the substrate in this range can prevent curling of the laminated body which could occur when the resin layer having a weight per square meter as described below is located on the substrate.

The substrate layer may be subjected to a surface treatment such as corona treatment, flame treatment, or anchor coat treatment. One of such surface treatments may be performed alone, or two or more surface treatments may be used in combination.

(Resin Layer and/or Coating Layer)

The resin layer or a coating layer which is included in the laminated body according to one embodiment of the present invention contains at least a poly(3-hydroxybutyrate) resin. In the present specification, the poly(3-hydroxybutyrate) resin (hereinafter also referred to as "P3HB resin") is an aliphatic polyester resin containing 3-hydroxybutyrate as repeating units.

The P3HB resin may be poly(3-hydroxybutyrate) which contains only 3-hydroxybutyrate as repeating units or may be a copolymer of 3-hydroxybutyrate and another hydroxyalkanoate.

The P3HB resin may be a mixture of a homopolymer and one or more copolymers or may be a mixture of two or more copolymers. The copolymerization is not limited to a particular type and may be random copolymerization, alternating copolymerization, block copolymerization, or graft copolymerization.

Examples of the P3HB resin include poly(3-hydroxybutyrate) (P3HB), poly(3-hydroxybutyrate-co-3-hydroxyhexanoate) (P3HB3HH), poly(3-hydroxybutyrate-co-3-hydroxyvalerate) (P3HB3HV), poly(3-hydroxybutyrate-co-4-hydroxybutyrate) (P3HB4HB), poly(3-hydroxybutyrate-co-3-hydroxyoctanoate) (P3HB3HO), poly(3-hydroxybutyrate-co-3-hydroxyoctadecanoate) (P3HB3HOD), poly(3-hydroxybutyrate-co-3-hydroxydecanoate) (P3HB3HD), and poly(3-hydroxybutyrate-co-3-hydroxyvalerate-co-3-hydroxyhexanoate) (P3HB3HV3HH). Among these, P3HB, P3HB3HH, P3HB3HV, and P3HB4HB are preferred since they are easy to industrially produce.

P3HB3HH, which is a copolymer of 3-hydroxybutyrate and 3-hydroxyhexanoate, is more preferred for the following reasons: the ratio between the repeating units can be varied to change the melting point and crystallinity and thus adjust the physical properties such as Young's modulus and heat resistance to levels intermediate between those of polypropylene and polyethylene; and this plastic is easy to industrially produce as mentioned above and useful in terms of physical properties. P3HB3HH is preferred also in that it can have a low melting point and be moldable at low temperature.

In the present embodiment, the P3HB resin preferably includes at least one type of P3HB3HH and particularly preferably includes at least two types of poly(3-hydroxybutyrate-co-3-hydroxyhexanoate) differing in the contents of the constituent monomers. It is also preferable for the P3HB resin to include at least one type of P3HB3HH and P3HB.

The P3HB resin can be produced by a microorganism. The microorganism is not limited to particular species and may be any microorganism having the ability to produce the P3HB resin. The first example of P3HB-producing bacteria is *Bacillus megaterium* discovered in 1925, and other examples include naturally occurring microorganisms such as *Cupriavidus necator* (formerly classified as *Alcaligenes eutrophus* or *Ralstonia eutropha*) and *Alcaligenes latus*. These microorganisms are known to accumulate P3HB in their cells.

Known examples of bacteria that produce copolymers of 3-hydroxybutyrate with other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038; see T. Fukui, Y. Doi, J. Bacteriol., 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable P3HB resin synthesis-related gene introduced may be used depending on the P3HB resin to be produced. The culture conditions including the type of the substrate may be optimized depending on the P3HB resin to be produced.

P3HB3HH can be produced, for example, by a method described in WO 2010/013483. An example of commercially-available P3HB3HH is "Kaneka Biodegradable Polymer PHBH™" of Kaneka Corporation.

The ratio between the constituent monomers (3HB/3HH) in P3HB3HH is preferably from 95 to 70/5 to 30 (mol %/mol %) and more preferably from 90 to 82/10 to 18 (mol %/mol %). When the 3HH content in P3HB3HH is 5 mol % or more, the melting point of the resin can be decreased below 180° C. which is the thermal decomposition temperature of the resin, and thermal decomposition of the resin layer can be easily prevented during a heating step. The crystallization rate of P3HB3HH having a 3HH content of 30 mol % or less is not too low, and the production of such P3HB3HH is relatively easy. The 3HH content in P3HB3HH can be determined by NMR spectroscopy of the P3HB3HH.

P3HB3HH having a 3HH content of 5 to 30 mol % can be obtained by culture. Such P3HB3HH may be used alone as the P3HB resin or may be used in combination with P3HB3HH having a 3HH content of less than 5 mol % or with P3HB (homopolymer of 3HB). With this combined use, a resin having melting characteristics described later can be more easily formed than when the P3HB3HH having a 3HH content of 5 to 30 mol % is used alone. In the P3HB3HH having a 3HH content of less than 5 mol %, the 3HH content is preferably 3 mol % or less, more preferably 2 mol % or less, and even more preferably 1 mol % or less.

The amount of the P3HB3HH having a 3HH content of less than 5 mol % or the amount of P3HB is not limited to a particular range, but is preferably from 1 to 50 wt %, more preferably from 3 to 30 wt %, even more preferably from 4 to 20 wt %, and particularly preferably from 5 to 15 wt %, of the total amount of the P3HB resin contained in the resin layer and/or coating layer.

Microbially produced P3HB3HH is a random copolymer. The adjustment of the 3HH content can be accomplished, for example, by selection of a suitable bacterium, by selection of a suitable carbon source as a raw material, by addition of P3HB3HH having a different 3HH content, or by addition of a homopolymer of 3HB.

In the present embodiment, the weight-average molecular weight of the P3HB resin is preferably $10\times10^4$ or more, more preferably $15\times10^4$ or more, and even more preferably $20\times10^4$ or more. When the weight-average molecular weight of the P3HB resin is $10\times10^4$ or more, the resin layer and/or coating layer has high mechanical strength, and resists breakage when the laminated body is subjected to folding or any other stress in secondary processing.

The weight-average molecular weight of the P3HB resin is preferably $70\times10^4$ or less, more preferably $60\times10^4$ or less, and even more preferably $55\times10^4$ or less. When the weight-average molecular weight of the P3HB resin is $70\times10^4$ or less, the melt viscosity of the resin is not too high, and fusion between the resin particles readily takes place in a heating step described later. This can prevent the formation of pinholes in the resin layer and/or coating layer.

The weight-average molecular weight of the P3HB resin can be determined as a polystyrene-equivalent molecular weight measured by gel permeation chromatography (GPC; "Shodex GPC-101" manufactured by Showa Denko K.K.) using a polystyrene gel ("Shodex K-804" manufactured by Showa Denko K.K.) as the column and chloroform as the mobile phase.

In the present embodiment, the P3HB resin preferably has melting characteristics which are such that in a crystalline melting curve obtained by differential scanning calorimetry, the P3HB resin has at least one peak top temperature (Tma) in the range of 100 to 150° C. and at least one peak top temperature (Tmb) in the range of 150 to 170° C. and that the difference between the temperatures Tma and Tmb is 10° C. or more. When the P3HB resin has a melting point peak in a relatively high temperature region of 150 to 170° C., a resin crystal having the Tmb acts as a crystal nucleus to accelerate crystallization of the P3HB resin after the heating step. This is advantageous for improving productivity in the production of the laminated body. Additionally, blocking can be reduced which occurs due to sticking between the substrate layer and the resin layer or coating layer when the laminated body is produced continuously and wound into a roll.

The difference between the temperatures Tma and Tmb is 10° C. or more, preferably 15° C. or more, more preferably 20° C. or more, and even more preferably 25° C. or more.

When the temperature difference is 10° C. or more, blocking in the roll-shaped laminated body can be further reduced. The upper limit of the difference between the temperatures Tma and Tmb is not limited to a particular value. In terms of ease of production, the temperature difference is, for example, 60° C. or less and more preferably 50° C. or less.

In the present specification, peak top temperatures in a crystalline melting curve obtained by differential scanning calorimetry are defined as follows. An aluminum pan is charged with 2 to 5 mg of a resin as the measurement object, and the resin is subjected to differential scanning calorimetry which uses a differential scanning calorimeter and in which the resin is melted under a stream of nitrogen by increasing the temperature from 20 to 190° C. at a rate of 10° C./min. In the crystalline melting curve obtained by the calorimetry, the temperature at which is located the top of a melting point peak present in the range of 100 to 150° C. is defined as the Tma, and the temperature at which is located the top of a melting point peak present in the range of 150 to 170° C. is defined as the Tmb. When there are a plurality of melting point peaks in the range of 100 to 150° C., the temperature at which is located the top of the highest of the melting point peaks is defined as the Tma. When there are a plurality of melting point peaks in the range of 150 to 170° C., the temperature at which is located the top of the highest of the melting point peaks is defined as the Tmb.

The resin layer and/or coating layer may contain one or more resins other than the P3HB resin so long as the effect of the invention is achieved. Examples of the other resins include: aliphatic polyester resins such as polybutylene succinate, polybutylene succinate adipate, polycaprolactone, and polylactic acid; and aliphatic-aromatic polyester resins such as polybutylene adipate terephthalate, polybutylene sebacate terephthalate, and polybutylene azelate terephthalate. The amount of these resins is preferably 20 parts by weight or less per 100 parts by weight of the P3HB resin in order to ensure the biodegradability of the resin layer. The resin layer need not contain any resin other than the P3HB resin.

The resin layer and/or coating layer may contain additives commonly used in the technical field so long as the effect of the invention is achieved. Examples of the additives include: inorganic fillers such as talc, calcium carbonate, mica, silica, titanium oxide, alumina, and kaolin; organic fillers such as chaff, wood powder, waste paper (e.g., newspaper), various kinds of starch, and cellulose; colorants such as pigments and dyes; odor absorbers such as activated carbon and zeolite; flavors such as vanillin and dextrin; and various other additives such as plasticizers, oxidation inhibitors, antioxidants, weathering resistance improvers, ultraviolet absorbers, nucleating agents, lubricants, mold releases, water repellents, antimicrobials, slidability improvers, tackifiers, fillers, and chemicals. The resin layer and/or coating layer may contain only one additive or may contain two or more additives. The amount of the additives can be set by those skilled in the art as appropriate depending on the intended use of the laminated body.

According to one embodiment of the present invention, the resin layer includes coating layers (A) and (B) stacked in this order on the substrate layer or coating layers (A), (C), and (B) stacked in this order on the substrate layer. The P3HB resins contained in the coating layers (A) and (B) or contained in the coating layers (A), (B), and (C) may be the same or different. Whether to add optional components such as resins other than the P3HB resins and additives to the coating layers may be chosen as appropriate by those skilled in the art depending on the intended use of the laminated body.

The resin layer may further include a layer other than the coating layers (A), (B), and (C).

The weight per unit area of the resin layer (in the case where the laminated body includes the resin layers on the opposite sides of the substrate, the weight per unit area of each of the resin layers on the opposite sides of the substrate) is preferably from 15 to 50 g/m$^2$, more preferably from 20 to 40 g/m$^2$, and particularly preferably from 25 to 35 g/m$^2$. The "weight" of the resin layer means the total dry weight of all the poly(3-hydroxybutyrate) resin-containing coating layers on one side of the substrate, and the "weight per unit area" may be referred to as "weight per square meter". When the weight per unit area of the resin layer is in the range as mentioned above, the resin layer can be prevented from having defects such as pinholes, can have sufficient strength for practical use, and can effectively exhibit properties such as water resistance. The dry weight per unit area of the resin layer can be measured by a method described in Examples below ("How to Measure Resin Weight per Square Meter").

(Aqueous Dispersions)

The aqueous dispersions each of which contains a poly (3-hydroxybutyrate) resin can be, but are not limited to being, produced by a method described below. First, a microorganism is allowed to produce a P3HB resin in its cells, and the microbial cells containing the P3HB resin are disrupted in an aqueous dispersion of the cells to separate the P3HB resin from the cells.

A commonly used method for collecting a P3HB resin from microbial cells is to dissolve the P3HB resin by using an organic solvent such as chloroform and precipitate and collect the P3HB resin by using a solvent such as methanol or hexane in which the P3HB resin is insoluble. However, this method is economically disadvantageous because the P3HB resin is not obtained in the form of fine particles and there is a need for an additional step of processing the P3HB resin into fine particles. In contrast, the step of disrupting microbial cells containing the P3HB resin in an aqueous dispersion of the cells to separate the P3HB resin from the cells can yield an aqueous dispersion of fine P3HB resin particles which are made of the P3HB resin produced in the microbial cells and a substantial portion of which have a sufficiently small particle size.

In the step of disrupting microbial cells containing the P3HB resin in an aqueous dispersion of the cells to separate the P3HB resin from the cells, it is preferable to perform the disruption and addition of an alkali simultaneously while stirring the microbial cells containing the P3HB resin. This method offers the following advantages: (1) the dispersion is prevented from having its viscosity increased by cellular components other than the P3HB resin which leak out of the microbial cells; (2) the prevention of viscosity increase of the cell dispersion allows for pH control, and continuous or intermittent addition of an alkali permits the process to proceed at a low alkali concentration; and (3) molecular weight reduction of the P3HB resin can be avoided, and the P3HB resin of high purity can be separated.

The cell dispersion preferably has a pH of 9 to 13.5 after the alkali addition. When the pH is 9 or higher, the P3HB resin is easy to separate from the cells. When the pH is 13.5 or lower, decomposition of the P3HB resin is likely to be avoided.

The microbial cell disruption may be accomplished using ultrasound or a device such as an emulsifying/dispersing machine, a high-pressure homogenizer, or a mill. Although the means for the microbial cell disruption is not limited to those mentioned below, the use of an emulsifying/dispersing machine such as Silverson Mixer (manufactured by Silverson), Clearmix (manufactured by M Technique Co., Ltd.), or Ebara Milder (manufactured by Ebara Corporation) is preferred in terms of dissolving out the P3HB resin from the cells by the alkali treatment, efficiently disrupting nucleic acids which are a primary cause of viscosity increase, and thoroughly dispersing insoluble substances other than the P3HB resin, such as cell walls, cell membranes, and insoluble proteins.

The temperature during the microbial cell disruption and alkali addition is preferably from room temperature to 50° C. The temperature is preferably around room temperature since the P3HB resin is likely to decompose if the temperature is higher than 50° C. Decreasing the temperature below room temperature requires a cooling operation and is not economical.

The dispersion resulting from the disruption and alkali treatment of the microbial cells is centrifuged to give a precipitate. The precipitate is washed with water and optionally with methanol, and finally a suitable amount of water is added. In this manner, an aqueous dispersion containing the P3HB resin at a desired solids concentration can be obtained.

The aqueous dispersion thus obtained may be subjected to the step of applying mechanical shear to the aqueous dispersion to separate aggregated particles of the P3HB resin from each another. The application of mechanical shear is preferred in terms of eliminating aggregates substantially and obtaining an aqueous dispersion containing P3HB resin particles that are uniform in particle size. The application of mechanical shear to the aqueous dispersion can be accomplished, for example, by means such as a stirrer, a homogenizer, or ultrasound. At this point, the P3HB resin particles are not so strongly aggregated; thus, the use of a stirrer equipped with a common stirring blade is preferred in terms of simplicity.

The solids concentration of the P3HB resin in each of the aqueous dispersions is preferably from 25 to 65 wt %, more preferably from 30 to 55 wt %, and particularly preferably from 35 to 50 wt %. When the solids concentration of the P3HB resin in each aqueous dispersion is in the above range, even application of the dispersion can be achieved since the viscosity of the aqueous dispersion is not too high. Another advantage is that a coat of the applied dispersion can have a required thickness and is less likely to suffer from defects.

The P3HB resin solids concentrations in the aqueous dispersions may be the same or different and may be chosen by those skilled in the art as appropriate depending on the intended use of the laminated body.

In terms of ensuring both the P3HB resin productivity and the coating uniformity, the average particle size of the P3HB resin in each aqueous dispersion is, for example, from 0.1 to 50 μm, preferably from 0.5 to 30 μm, and more preferably from 0.8 to 20 μm. When the average particle size is 0.1 μm or more, the P3HB resin can easily be obtained either by microbial production or by chemical synthesis. When the average particle size is 50 μm or less, uneven application of the aqueous dispersion can be avoided.

The average particle size of the P3HB resin in each aqueous dispersion can be measured by adjusting the aqueous dispersion containing the P3HB resin to a given concentration and subjecting the dispersion to analysis using a widely used particle size analyzer such as Microtrac particle size analyzer (FRA manufactured by Nikkiso Co., Ltd.). The average particle size can be determined as a particle size at which the cumulative percentage in a normal distribution curve reaches 50% of all the particles.

Examples of water-soluble polymer dispersants that can be used in the present embodiment include: polyvinyl alcohol; polyvinyl alcohol derivatives such as carboxy-modified polyvinyl alcohol, sulfone-modified polyvinyl alcohol, and ethylene-modified polyvinyl alcohol; cellulose derivatives such as methyl cellulose, carboxymethyl cellulose, hydroxyethyl cellulose, and hydroxypropyl cellulose; starch; starch derivatives such as oxidized starch and etherified starch; chitin; chitosan; casein; and gum arabic. One of these water-soluble polymer dispersants may be used alone, or two or more thereof may be used in combination.

The amount of a water-soluble polymer dispersant (a2) used in the aqueous poly(3-hydroxybutyrate) resin dispersion (HB-A) is preferably from 0.1 to 2.0 parts by weight, more preferably from 0.3 to 1.8 parts by weight, and particularly preferably from 1.0 to 1.5 parts by weight per 100 parts by weight of the poly(3-hydroxybutyrate) resin (a1) contained in the aqueous dispersion (HB-A). Controlling the amount of the water-soluble polymer dispersant (a2) in this range can prevent the coating layer (A) from peeling off from the substrate layer in a heating process subsequent to application of the aqueous dispersion (HB-A) and ensure a high adhesion strength between the substrate layer and the poly(3-hydroxybutyrate) resin after the heating process.

The aqueous poly(3-hydroxybutyrate) resin dispersion (HB-B) may be substantially free of a water-soluble polymer dispersant (b2). For the purpose of preventing aggregation of the poly(3-hydroxybutyrate) resin (b1) contained in the aqueous dispersion (HB-B) and allowing the poly(3-hydroxybutyrate) resin (b1) to disperse stably, the aqueous dispersion (HB-B) may contain the water-soluble polymer dispersant (b2) to the extent that the water resistance of the coating layer (B) is not sacrificed.

The amount of the water-soluble polymer dispersant (b2) used is preferably from 0 to 0.5 parts by weight per 100 parts by weight of the poly(3-hydroxybutyrate) resin (b1) contained in the aqueous dispersion (HB-B). Controlling the amount of the water-soluble polymer dispersant (b2) in this range permits an increase in the amount of the aqueous dispersion (HB-B) applied to the coating layer (A) without sacrifice of the water resistance of the coating layer (B) and makes it possible to increase the weights per square meter of the coating layer (B) and the resin layer. In the case where the water-soluble polymer dispersant (b2) is used, the amount of the dispersant (b2) is preferably from 0.1 to 0.5 parts by weight. The amount of the dispersant (b2) may be at most 0.4 parts by weight or at most 0.3 parts by weight. The expression "substantially free of a water-soluble polymer dispersant" as used herein means that the water-soluble polymer dispersant is not used to obtain a stabilizing effect on dispersing of a resin.

The aqueous dispersion (HB-A) and/or (HB-B) may, if necessary, contain a dispersant other than water-soluble polymers. The dispersant other than water-soluble polymers is not limited to a particular type, and examples of such a dispersant include: anionic surfactants such as sodium lauryl sulfate and sodium oleate; cationic surfactants such as lauryl trimethyl ammonium chloride; and non-ionic surfactants such as glycerin fatty acid esters and sorbitan fatty acid esters. One of these surfactants may be used alone, or two or more thereof may be used in combination.

An aqueous poly(3-hydroxybutyrate) resin dispersion (HB-C) is an aqueous dispersion for forming the coating layer (C) which is an intermediate layer between the coating layer (A) and the coating layer (B). The dispersant contained in the aqueous dispersion (HB-C) may be the same as or different from that contained in the aqueous dispersion (HB-A) or (HB-B) and may be selected as appropriate depending on how to apply the aqueous dispersion (HB-C).

Each of the dispersants as described above can be added to the aqueous dispersion after water washing following centrifugation subsequent to disruption and alkali treatment of microbial cells. When methanol washing is carried out, the dispersant can be added after the methanol washing and before or after a suitable amount of water is added to adjust the solids concentration of the P3HB resin.

(Method for Producing Laminated Body)

A production method according to one aspect of the present embodiment includes: forming the coating layer (A) as a first layer by applying the aqueous dispersion (HB-A) to one or both sides of the substrate layer and heating the applied aqueous dispersion (HB-A) into a dry layer; and subsequently forming the coating layer (B) by applying the aqueous dispersion (HB-B) to the coating layer (A) and heating the applied aqueous dispersion (HB-B) into a dry layer. This way of forming the resin layer by forming coating layers one by one makes it easy to prevent peeling between the substrate and the resin layer and at the same time form the coating layer (B) having high water resistance as an outermost layer.

The weight (dry weight) per unit area (weight per square meter) of the coating layer (A) is preferably from 0.5 to 10 $g/m^2$, more preferably from 1 to 8 $g/m^2$, and particularly preferably from 3 to 7 $g/m^2$. In the case where such a coating layer having a relatively small weight per square meter is formed on the surface of the substrate and then the coating layer (B) is formed (or the coating layers (B) and (C) are formed), peeling between the resin layer and the substrate layer can be prevented, and at the same time the formed resin layer can have a large weight per square meter as a whole.

If the weight per square meter of the coating layer (A) is less than 0.5 $g/m^2$, the thickness of the coating layer (A) tends to be non-uniform, and the coating layer (B) tends to peel off from the substrate after the aqueous dispersion (HB-B) applied to the coating layer (A) is subjected to a heating process described later. If the weight per square meter of the coating layer (A) is more than 10 $g/m^2$, the adhesion strength between the coating layer (A) and the substrate tends to be low.

The weight (dry weight) per unit area (weight per square meter) of the coating layer (B) is adjusted as appropriate taking into account the weight per unit area of the coating layer (A) so that the weight per unit area of the resin layer may be from 15 to 50 $g/m^2$. Formation of the resin layer having a weight per unit area of more than 50 $g/m^2$ is not only uneconomical, but suffers from insufficient resin melting which makes it difficult to ensure the uniformity of the resin layer.

A production method according to another aspect of the present embodiment includes: forming the coating layer (A) on one or both sides of the substrate layer; subsequently forming the coating layer (C) as an intermediate layer by applying the aqueous dispersion (HB-C) containing a poly (3-hydroxybutyrate) resin (c1) to the coating layer (A) and heating the applied aqueous dispersion (HB-C) into a dry layer; and then forming the coating layer (B) on the coating layer (C). Inserting the coating layer (C) as an intermediate layer further reduces the formation of pinholes and makes it easier to ensure the barrier performance of the resin layer against water and oils.

The weight (dry weight) per unit area (weight per square meter) of the coating layer (C) is preferably from 5 to 10 $g/m^2$. The formation of the coating layer (C) may be done by repeating application of the aqueous dispersion (HB-C) and heating of the applied aqueous dispersion (HB-C) into a dry layer.

The method for applying each aqueous dispersion to the substrate is not limited to a particular technique and may be any method by which a desired coating layer can be formed substantially on the substrate. Examples include known methods such as a spray method, a spreading method, a slit coater method, an air knife coater method, a roll coater method, a bar coater method, a comma coater method, a blade coater method, a screen printing method, and a gravure printing method, and these methods may be used alone or in combination. The application of the aqueous dispersion (HB-A) may be preceded by the step of subjecting the substrate to a surface treatment such as corona treatment as mentioned above.

The formation of each coating layer is accomplished by heating a coat of the applied aqueous dispersion on the substrate to a temperature equal to or higher than the melting point of the P3HB resin to evaporate water from the aqueous dispersion and fuse together the P3HB resin particles contained in the aqueous dispersion. The melting point of the P3HB resin refers to the highest of peak top temperatures in a crystalline melting curve obtained by the differential scanning calorimetry described above. For example, when there are the temperatures Tma and Tmb, the melting point refers to the Tmb.

The above heating process can be carried out by using a known heating technique, examples of which include hot air heating, infrared heating, microwave heating, roll heating, and hot plate heating. One of these techniques may be used alone, or two or more thereof may be used in combination.

The heating temperature in the heating process only needs to be equal to or higher than the melting point of the P3HB resin, and is preferably from 10 to 40° C. above, more preferably from 20 to 30° C. above, the melting point of the P3HB resin. Specifically, the heating temperature is preferably 160° C. or higher, more preferably 165° C. or higher, and particularly preferably 170° C. or higher. The heating temperature is preferably 200° C. or lower. When the heating temperature is 200° C. or lower, problems can be avoided such as reduced mechanical strength and breakage of the laminated body which arise from excessive drying of the substrate layer or thermal decomposition of the P3HB resin.

The heating temperature in the heating process is not intended to mean the actual temperature of the laminated body itself but refers to a set temperature of a device such as a drying oven or roll which is used in the heating process.

The heating time in the heating process can be set as appropriate in view of drying of the coat of the applied dispersion and the molten state of the resin. For example, the heating time is preferably from 3 seconds to 3 minutes, more preferably from 5 to 60 seconds, and even more preferably from 10 to 30 seconds.

The heating process is preferably followed by a temperature keeping process in which the temperature is kept equal to or lower than the melting point of the P3HB resin. The temperature is preferably kept at 35 to 70° C. and more preferably at 40 to 60° C. Keeping the temperature in this range allows the P3HB resin to crystallize quickly after the heating process and is advantageous for improving productivity in the production of the laminated body. Additionally, blocking can be reduced which occurs due to sticking between the substrate layer and the resin layer or coating layer when the laminated body is produced continuously and wound into a roll.

The temperature keeping process can be carried out using the same heating technique as the heating process previously described. Examples of the heating technique include hot air heating, infrared heating, microwave heating, roll heating, and hot plate heating. One of these techniques may be used alone, or two or more thereof may be used in combination. In particular, to achieve the uniformity of the surface properties of the resin layer, it is preferable to use rolls adjusted to a given temperature, bring one of the rolls into contact with the resin-coated surface of the laminated body and the other of the rolls into contact with the substrate layer, and thereby press the laminated body between the rolls.

The temperature kept in the temperature keeping process is not intended to mean the actual temperature of the laminated body itself but refers to a set temperature of a device such as a drying oven or roll which is used in the heating process.

The time of the temperature keeping process can be set as appropriate in view of the effect of the temperature keeping process. For example, the time of the temperature keeping process is preferably from 3 seconds to 1 minute, more preferably from 5 to 30 seconds, and even more preferably from 10 to 20 seconds.

In the case where the substrate is paper, the heating process and the optional temperature keeping process may be followed, if necessary, by a so-called conditioning process in which water is applied to the paper substrate to adjust the amount of water contained in the paper substrate. A flattening process using a device such as a machine calender or a soft calender may also be performed.

The method for applying water to the paper substrate is not limited to a particular technique and may be any method by which water can be evenly applied to the paper substrate. Examples include known methods such as a spray method, a spreading method, a slit coater method, an air knife coater method, a roll coater method, a bar coater method, a comma coater method, a blade coater method, a screen printing method, and a gravure printing method, and these methods may be used alone or in combination. Among these methods, the spray method is preferred since this method allows for even application of a small amount of water. The water spraying can be carried out, for example, using a commercially-available liquid applicator characterized by non-contact application.

The water may contain additives to the extent that the additives are not adverse to the purpose of water application. Examples of the additives include: moisturizers such as glycerin and propylene glycol; various flavors; and preservatives.

The series of steps for forming the coating layers may be performed on a substrate cut beforehand into a sheet shape. Alternatively, a substrate wound in a roll may be prepared as a web roll, and the series of steps for forming the coating layers may be continuously performed on the substrate which is being unwound and transferred continuously by means of a common transfer device for transfer of sheets, films, paper, and the like.

(Uses)

The laminated body obtained by the present embodiment can be processed into a molded article by secondary processing. Examples of the molded article include a tube, a plate, a rod, a packaging material (e.g., a bag), a container (e.g., a bottle), and a part. In particular, the molded article is suitable for use as any of various kinds of packaging materials or containers such as shopping bags, various other kinds of bags, packaging materials for foods or confectionery products, cups, trays, and cartons. That is, the molded article is suitable for use in various fields such as food industry, cosmetic industry, electronic industry, medical industry, and pharmaceutical industry. Since the molded article includes a resin layer on one side of a paper substrate and the resin layer has high bond strength to the substrate and has high heat resistance, the molded article is particularly suitable for use as a container for a hot substance. Examples of such a container include: liquid containers such as, in particular, cups for foods or beverages such as instant noodles, instant soups, and coffee; and trays used for prepared foods, boxed lunches, or microwavable foods.

The secondary processing can be performed using any method known in the technical field. For example, the secondary processing can be performed by means such as a bag-making machine or form-fill-sealing machine. Alternatively, the laminated body may be processed using a device such as a paper tray press molding machine, a paper cup molding machine, a punching machine, or a case former. In any of these processing machines, any known technique can be used for the laminated body bonding. Examples of the technique include heat sealing, impulse sealing, ultrasonic sealing, high-frequency sealing, hot air sealing, and flame sealing. The heat sealing may be carried out between the substrate layer and the resin layer or between different portions of the resin layer.

The molded article may, for the purpose of physical property improvement, be combined with another molded article (such as a fiber, a yarn, a rope, a woven fabric, a knit, a non-woven fabric, paper, a film, a sheet, a tube, a plate, a rod, a container, a bag, a part, or a foam) made of a different material than the molded article of the present embodiment. The material of the other molded article is also preferably biodegradable.

In the following items, preferred aspects of the present disclosure are listed. The present invention is not limited to the following items.

[Item 1]

A method for producing a laminated body including a substrate layer and a resin layer formed on at least one side of the substrate layer, the resin layer containing a poly(3-hydroxybutyrate) resin and having a weight per unit area (dry weight) of 15 to 50 g/m$^2$, the method including at least the sequential steps of.

(i) applying an aqueous dispersion (HB-A) to a surface of the substrate layer to form a coat (a) of the aqueous dispersion (HB-A) and heating the coat (a) to form a coating layer (A) having a weight per unit area (dry weight) of 0.5 to 10 g/m$^2$, wherein the aqueous dispersion (HB-A) contains a poly(3-hydroxybutyrate) resin (a1) and a dispersant (a2) including a water-soluble polymer, and an amount of the dispersant (a2) is from 0.1 to 2.0 parts by weight per 100 parts by weight of the poly(3-hydroxybutyrate) resin (a1); and (ii) applying an aqueous dispersion (HB-B) to a side having the coating layer (A) to form a coat (b) of the aqueous dispersion (HB-B) and heating the coat (b) to form a coating layer (B), wherein the aqueous dispersion (HB-B) contains a poly(3-hydroxybutyrate) resin (b1) and a dispersant (b2) including a water-soluble polymer, and an amount of the dispersant (b2) is from 0 to 0.5 parts by weight per 100 parts by weight of the poly(3-hydroxybutyrate) resin (b1).

[Item 2]

The method according to item 1, wherein at least one of the poly(3-hydroxybutyrate) resins (a1) and (b1) has a weight-average molecular weight of $10\times10^4$ to $70\times10^4$.

[Item 3]

The method according to item 1 or 2, wherein in a crystalline melting curve obtained by differential scanning calorimetry of at least one of the poly(3-hydroxybutyrate) resins (a1) and (b1), the at least one of the poly(3-hydroxybutyrate) resins (a1) and (b1) has at least one peak top temperature (Tma) in a range of 100 to 150° C. and at least one peak top temperature (Tmb) in a range of 150 to 170° C., and a difference between the temperatures Tma and Tmb is 10° C. or more.

[Item 4]

The method according to any one of items 1 to 3, wherein at least one of the poly(3-hydroxybutyrate) resins (a1) and (b1) includes at least one type of poly(3-hydroxybutyrate-co-3-hydroxyhexanoate).

[Item 5]

The method according to any one of items 1 to 4, wherein in at least one of the aqueous dispersions (HB-A) and (HB-B), a solids concentration of the poly(3-hydroxybutyrate) resin (a1) or (b1) is from 25 to 65 wt %.

[Item 6]

The method according to any one of items 1 to 5, further including, between the steps (i) and (ii), the step of:

(iii) applying an aqueous dispersion (HB-C) containing a poly(3-hydroxybutyrate) resin (c1) to the side having the coating layer (A) to form a coat (c) of the aqueous dispersion (HB-C) and heating the coat (c) to form a coating layer (C).

[Item 7]

The method according to item 6, wherein at least one of the poly(3-hydroxybutyrate) resins (a1), (b1), and (c1) has a weight-average molecular weight of $10\times10^4$ to $70\times10^4$.

[Item 8]

The method according to item 6 or 7, wherein in a crystalline melting curve obtained by differential scanning calorimetry of at least one of the poly(3-hydroxybutyrate) resins (a1), (b1), and (c1), the at least one of the poly(3-hydroxybutyrate) resins (a1), (b1), and (c1) has at least one peak top temperature (Tma) in a range of 100 to 150° C. and at least one peak top temperature (Tmb) in a range of 150 to 170° C., and a difference between the temperatures Tma and Tmb is 10° C. or more.

[Item 9]

The method according to any one of items 6 to 8, wherein at least one of the poly(3-hydroxybutyrate) resins (a1), (b1), and (c1) includes at least one type of poly(3-hydroxybutyrate-co-3-hydroxyhexanoate).

[Item 10]

The method according to any one of items 6 to 9, wherein in at least one of the aqueous dispersions (HB-A), (HB-B), and (HB-C), a solids concentration of the poly(3-hydroxybutyrate) resin (a1), (b1), or (c1) is from 25 to 65 wt %.

[Item 11]

The method according to any one of items 1 to 10, wherein the substrate layer is biodegradable.

[Item 12]

The method according to item 11, wherein the substrate layer is paper.

[Item 13]

A laminated body including:

a substrate layer; and a resin layer formed on at least one side of the substrate layer, containing a poly(3-hydroxybutyrate) resin, and having a weight per unit area (dry weight) of 15 to 50 $g/m^2$, wherein the resin layer includes a coating layer (A) having a weight per unit area (dry weight) of 0.5 to 10 $g/m^2$ and containing a poly(3-hydroxybutyrate) resin (a1) and a dispersant (a2) including a water-soluble polymer, wherein an amount of the dispersant (a2) is from 0.1 to 2.0 parts by weight per 100 parts by weight of the poly(3-hydroxybutyrate) resin (a1), and a coating layer (B) containing a poly(3-hydroxybutyrate) resin (b1) and a dispersant (b2) including a water-soluble polymer, wherein an amount of the dispersant (b2) is from 0 to 0.5 parts by weight per 100 parts by weight of the poly(3-hydroxybutyrate) resin (b1), and the substrate layer, the coating layer (A), and the coating layer (B) are arranged in this order.

[Item 14]

The laminated body according to item 13, further including a coating layer (C) containing a poly(3-hydroxybutyrate) resin (c1) and located between the coating layer (A) and the coating layer (B).

[Item 15]

A molded article including the laminated body according to item 13 or 14.

[Item 16]

The molded article according to item 15, wherein the molded article is a container for a food or beverage.

EXAMPLES

Hereinafter, the present invention will be specifically described based on examples. The technical scope of the present invention is not limited by the examples.

(How to Measure Resin Weight per Square Meter)

Each of the laminated bodies obtained in Examples and Comparative Examples was cut into a 10 cm×10 cm piece, the weight of which was measured. The weight of the substrate was subtracted from the measured weight, and the difference was multiplied by 100. The resulting value was used as the resin weight per square meter (dry weight per unit area of the resin layer or coating layer).

(Adhesion between Substrate (Paper) and Resin Layer)

Each of the laminated bodies obtained in Examples and Comparative Examples was evaluated for adhesion between the substrate layer and the resin layer and rated according to the criteria listed below. The crosscut test mentioned in the criteria was conducted as follows: the resin layer was cut with a cutter knife to make a crosscut with a length of 30 mm, then Cellotape™ (product name: Nichiban CT-18) was attached to the cut surface of the resin layer and peeled by hand, and the peel strength was evaluated as to peeling of the resin layer from the substrate layer.

<Ratings>

Excellent: The resin layer did not peel off from the substrate after the heating process. In the crosscut test, paper fibers stuck to the peeled resin layer.

Good: The resin layer did not peel off from the substrate after the heating process. In the crosscut test, some resistance was felt during peeling of the resin layer, but paper fibers did not stick to the resin layer.

Poor: The resin layer peeled off from the substrate and cracked all over its surface after the heating process.

(How to Produce Aqueous P3HB3HH Dispersion)

An aqueous dispersion containing P3HB3HH at a solids concentration of 50 wt % was obtained according to a method described in WO 2015/146195. For the P3HB3HH, the content of 3-hydroxyhexanoate units was 11 mol %

(weight-average molecular weight=$55 \times 10^4$), the top temperature Tma of a melting point peak present in the range of 100 to 150° C. was 110° C., and the top temperature Tmb of a melting point peak present in the range of 150 to 170° C. was 160° C.

The temperatures Tma and Tmb were measured as follows: the aqueous dispersion obtained as above was heated to dryness by a hot dryer set to 60° C. to obtain a dry product, and 2 to 5 mg of the dry product was put into an aluminum pan and subjected to differential scanning calorimetry which used a differential scanning calorimeter and in which the dry product was melted under a stream of nitrogen by increasing the temperature from 20 to 190° C. at a rate of 10° C./min.

(How to Produce Aqueous Dispersions)

HB-A1, HB-B2: Methyl cellulose (METOLOSE SM-400 manufactured by Shin-Etsu Chemical Co., Ltd.) was used as a water-soluble polymer dispersant, and the aqueous P3HB3HH dispersion, the methyl cellulose, and water were mixed in such proportions that the amount of the methyl cellulose was 0.3 parts by weight per 100 parts by weight of the resin contained in the aqueous P3HB3HH dispersion. The mixture was stirred to obtain an aqueous dispersion in which the total solids concentration of the P3HB3HH and the dispersant was 40 wt % (P3HB3HH solids concentration=39.9 wt %).

HB-A2: An aqueous dispersion was obtained in the same manner as the aqueous dispersion HB-A1, except that the amount of the methyl cellulose was 1.0 parts by weight per 100 parts by weight of the P3HB3HH resin. In the obtained aqueous dispersion, the total solids concentration of the P3HB3HH and the dispersant was 40 wt % (P3HB3HH solids concentration=39.6 wt %).

HB-A3, HB-C1: An aqueous dispersion was obtained in the same manner as the aqueous dispersion HB-A1, except that the amount of the methyl cellulose was 1.5 parts by weight per 100 parts by weight of the P3HB3HH resin. In the obtained aqueous dispersion, the total solids concentration of the P3HB3HH and the dispersant was 40 wt % (P3HB3HH solids concentration=39.4 wt %).

HB-B1: Water was added to the aqueous P3HB3HH dispersion to obtain an aqueous dispersion in which the solids concentration of the P3HB3HH was 40 wt %.

Example 1

The aqueous dispersion HB-A1 was applied to one side of cup paper having a weight per square meter of 200 g/$m^2$ by means of a bar coater. The application was done in such a way that the resin weight per square meter would be 3 g/$m^2$ after drying. The applied aqueous dispersion HB-A1 on the cup paper was then heated in a hot air drying oven set to 180° C. for 1 minute to form a coating layer (A). Subsequently, the aqueous dispersion HB-B1 was applied to the coating layer (A) by means of a bar coater in such a way that the resin weight per square meter would be 15 g/$m^2$ after drying. The applied aqueous dispersion HB-B1 on the coating layer (A) was heated in a hot air drying oven set to 180° C. for 2 minutes to form a coating layer (B) and thereby complete formation of a resin layer.

The laminated body thus obtained was evaluated for adhesion between the substrate (paper) and the resin layer. The result is shown in Table 1.

Examples 2 to 4

Laminated bodies were obtained in the same manner as the laminated body of Example 1, except that the types of the aqueous dispersions used to form the coating layers (A) and (B) and the resin weights per square meter after drying were as shown for Examples 2 to 4 in Table 1. Each of the obtained laminated bodies was evaluated for adhesion between the substrate (paper) and the resin layer. The results are shown in Table 1.

Example 5

The aqueous dispersion HB-A3 was applied to one side of cup paper having a weight per square meter of 200 g/$m^2$ by means of a bar coater. The application was done in such a way that the resin weight per square meter would be 1 g/$m^2$ after drying. The applied aqueous dispersion HB-A3 on the cup paper was then heated in a hot air drying oven set to 180° C. for 30 seconds to form a coating layer (A). Subsequently, the aqueous dispersion HB-C1 was applied to the coating layer (A) by means of a bar coater in such a way that the resin weight per square meter would be 10 g/$m^2$ after drying. The applied aqueous dispersion HB-C1 on the coating layer (A) was heated in a hot air drying oven set to 180° C. for 1 minute to form a coating layer (C). The aqueous dispersion HB-B2 was further applied to the coating layer (C) by means of a bar coater in such a way that the resin weight per square meter would be 25 g/$m^2$ after drying. The applied aqueous dispersion HB-B2 on the coating layer (C) was heated in a hot air drying oven set to 180° C. for 2 minutes to complete formation of a resin layer.

The laminated body thus obtained was evaluated for adhesion between the substrate (paper) and the resin layer. The result is shown in Table 1.

Comparative Example 1

The aqueous dispersion HB-B1 was applied to one side of cup paper having a weight per square meter of 200 g/$m^2$ by means of a bar coater. The application was done in such a way that the resin weight per square meter would be 15 g/$m^2$ after drying. The applied aqueous dispersion HB-B1 on the cup paper was then heated in a hot air drying oven set to 180° C. for 2 minutes to form a resin layer. The laminated body thus obtained was evaluated for adhesion between the substrate (paper) and the resin layer. The result is shown in Table 1.

Comparative Example 2

A laminated body was obtained in the same manner as the laminated body of Comparative Example 1, except that the aqueous dispersion HB-B2 was used and applied in such a way that the resin weight per square meter would be 25 g/$m^2$ after drying. The laminated body thus obtained was evaluated for adhesion between the substrate (paper) and the resin layer. The result is shown in Table 1.

TABLE 1

| | | Ex. 1 | Ex. 2 | Ex. 3 | Ex. 4 | Ex. 5 | Comp. 1 | Comp. 2 |
|---|---|---|---|---|---|---|---|---|
| Coating layer | Aqueous dispersion | HB-A1 | HB-A1 | HB-A2 | HB-A3 | HB-A3 | | |
| (A) | Dispersant | 0.3 | 0.3 | 1.0 | 1.5 | 1.5 | | |

TABLE 1-continued

| | | Ex. 1 | Ex. 2 | Ex. 3 | Ex. 4 | Ex. 5 | Comp. 1 | Comp. 2 |
|---|---|---|---|---|---|---|---|---|
| | (parts by weight per 100 parts by weight of P3HB resin (a1)) | | | | | | | |
| | Weight per square meter ($g/m^2$) | 3 | 5 | 7 | 7 | 1 | | |
| Coating layer (C) | Aqueous dispersion | | | | | HB-C1 | | |
| | Dispersant (parts by weight per 100 parts by weight of P3HB resin (c1)) | | | | | 1.5 | | |
| | Weight per square meter ($g/m^2$) | | | | | 10 | | |
| Coating layer (B) | Aqueous dispersion | HB-B1 | HB-B2 | HB-B2 | HB-B2 | HB-B2 | HB-B1 | HB-B2 |
| | Dispersant (parts by weight per 100 parts by weight of P3HB resin (b1)) | 0 | 0.3 | 0.3 | 0.3 | 0.3 | 0 | 0.3 |
| | Weight per square meter ($g/m^2$) | 15 | 20 | 25 | 25 | 25 | 15 | 25 |
| Resin layer [(A) + (B) + (C)] | Weight per square meter ($g/m^2$) | 18 | 25 | 32 | 32 | 26 | 15 | 25 |
| Adhesion between substrate and resin layer | | Good | Good | Good | Excellent | Excellent | Poor | Poor |

[Results]

Table 1 reveals that in Examples 1 to 5 where the coating layer (A) with a given weight per square meter was formed first on the paper substrate, the resin layer was prevented from peeling off after the heating processes performed on the coats of the applied dispersions, and a laminated body including the resin layer having a large weight per square meter was successfully produced.

In Comparative Examples 1 to 2 where a resin layer with a large weight per square meter was formed in one step, the resin layer peeled off from the substrate layer and cracked all over its surface. It is inferred that poly(3-hydroxybutyrate) resins have low affinity for other materials and that if a substrate layer is directly coated with a resin layer having a large weight per square meter without forming the coating layer (A) having a small weight per square meter on the substrate layer as in Examples, the resin particles become aggregated and fused together during a heating process without the resin being spread over the substrate and consequently the resin layer peels off from the substrate layer.

The invention claimed is:

1. A method for producing a laminated body comprising a substrate layer and a resin layer formed on at least one side of the substrate layer, wherein the resin layer comprises a poly(3-hydroxybutyrate) resin and has a weight per unit area, dry weight, of from 15 to 50 $g/m^2$, the method comprising sequentially:

(i) applying an aqueous dispersion (HB-A) to a surface of the substrate layer to form a coat (a) of the aqueous dispersion (HB-A) and heating the coat (a) to form a coating layer (A) having a weight per unit area, dry weight, of from 0.5 to 10 $g/m^2$, wherein the aqueous dispersion (HB-A) comprises a poly(3-hydroxybutyrate) resin (a1) and a dispersant (a2) comprising a water-soluble polymer, and an amount of the dispersant (a2) is from 0.1 to 2.0 parts by weight per 100 parts by weight of the poly(3-hydroxybutyrate) resin (a1); and (ii) applying an aqueous dispersion (HB-B) to a side having the coating layer (A) to form a coat (b) of the aqueous dispersion (HB-B) and heating the coat (b) to form a coating layer (B), wherein the aqueous dispersion (HB-B) comprises a poly(3-hydroxybutyrate) resin (b1) and a dispersant (b2) comprising a water-soluble polymer, and an amount of the dispersant (b2) is from 0 to 0.5 parts by weight per 100 parts by weight of the poly(3-hydroxybutyrate) resin (b1).

2. The method according to claim 1, wherein at least one of the poly(3-hydroxybutyrate) resins (a1) and (b1) has a weight-average molecular weight of from $10\times10^4$ to $70\times10^4$.

3. The method according to claim 1, wherein in a crystalline melting curve obtained by differential scanning calorimetry of at least one of the poly(3-hydroxybutyrate) resins (a1) and (b1), the at least one of the poly(3-hydroxybutyrate) resins (a1) and (b1) has at least one peak top temperature (Tma) of from 100 to 150° C. and at least one peak top temperature (Tmb) of from 150 to 170° C., and a difference between the temperatures Tma and Tmb is at least 10° C.

4. The method according to claim 1, wherein at least one of the poly(3-hydroxybutyrate) resins (a1) and (b1) comprises at least one type of poly(3-hydroxybutyrate-co-3-hydroxyhexanoate).

5. The method according to claim 1, wherein in at least one of the aqueous dispersions (HB-A) and (HB-B), a solids concentration of the poly(3-hydroxybutyrate) resin (a1) or (b1) is from 25 to 65 wt %.

6. The method according to claim 1, wherein the substrate layer is biodegradable.

7. The method according to claim 6, wherein the substrate layer is paper.

8. The method according to claim 1, further comprising, between (i) and (ii):

(iii) applying an aqueous dispersion (HB-C) comprising a poly(3-hydroxybutyrate) resin (c1) to the side having the coating layer (A) to form a coat (c) of the aqueous dispersion (HB-C) and heating the coat (c) to form a coating layer (C).

9. The method according to claim 8, wherein at least one of the poly(3-hydroxybutyrate) resins (a1), (b1), and (c1) has a weight-average molecular weight of from $10\times10^4$ to $70\times10^4$.

10. The method according to claim 8, wherein in a crystalline melting curve obtained by differential scanning calorimetry of at least one of the poly(3-hydroxybutyrate) resins (a1), (b1), and (c1), the at least one of the poly(3-hydroxybutyrate) resins (a1), (b1), and (c1) has at least one peak top temperature (Tma) of from 100 to 150° C. and at least one peak top temperature (Tmb) of from 150 to 170° C., and a difference between the temperatures Tma and Tmb is at least 10° C.

11. The method according to claim 8, wherein at least one of the poly(3-hydroxybutyrate) resins (a1), (b1), and (c1) comprises at least one type of poly(3-hydroxybutyrate-co-3-hydroxyhexanoate).

12. The method according to claim 8, wherein in at least one of the aqueous dispersions (HB-A), (HB-B), and (HB-C), a solids concentration of the poly(3-hydroxybutyrate) resin (a1), (b1), or (c1) is from 25 to 65 wt %.

13. A laminated body comprising:

a substrate layer; and a resin layer formed on at least one side of the substrate layer, comprising a poly(3-hydroxybutyrate) resin, and having a weight per unit area, dry weight, of from 15 to 50 $g/m^2$, wherein the resin layer comprises a coating layer (A) having a weight per unit area, dry weight, of from 0.5 to 10 $g/m^2$ and comprising a poly(3-hydroxybutyrate) resin (a1) and a dispersant (a2) comprising a water-soluble polymer, wherein an amount of the dispersant (a2) is from 0.1 to 2.0 parts by weight per 100 parts by weight of the poly(3-hydroxybutyrate) resin (a1), and a coating layer (B) comprising a poly(3-hydroxybutyrate) resin (b1) and a dispersant (b2) comprising a water-soluble polymer, wherein an amount of the dispersant (b2) is from 0 to 0.5 parts by weight per 100 parts by weight of the poly(3-hydroxybutyrate) resin (b1), and the substrate layer, the coating layer (A), and the coating layer (B) are arranged in this order.

14. The laminated body according to claim 13, further comprising a coating layer (C) comprising a poly(3-hydroxybutyrate) resin (c1) and located between the coating layer (A) and the coating layer (B).

15. A molded article comprising the laminated body of claim 13.

16. The molded article according to claim 15, wherein the molded article is a container for a food or beverage.

* * * * *